(12) United States Patent
Jacobs, II et al.

(10) Patent No.: US 10,025,805 B1
(45) Date of Patent: Jul. 17, 2018

(54) SYSTEMS AND METHODS FOR AUTOMATED HELP

(71) Applicant: Benko, LLC, New London, NH (US)

(72) Inventors: James L. Jacobs, II, Amherst, NH (US); John E. Cronin, Bonita Springs, FL (US); Steven M. Lynch, Hudson, NH (US); Christopher M. Huffines, Williston, VT (US)

( * ) Notice: Subject to any disclaimer, the term of this patent is extended or adjusted under 35 U.S.C. 154(b) by 969 days.

(21) Appl. No.: 14/313,676

(22) Filed: Jun. 24, 2014

(51) Int. Cl.
*G06F 17/00* (2006.01)
*G06F 17/30* (2006.01)

(52) U.S. Cl.
CPC .. *G06F 17/30312* (2013.01); *G06F 17/30598* (2013.01)

(58) Field of Classification Search
CPC ................ G06F 17/30312; G06F 17/30598
See application file for complete search history.

(56) References Cited

U.S. PATENT DOCUMENTS

| | | |
|---|---|---|
| 4,495,559 A | 1/1985 | Gelatt, Jr. et al. |
| 5,117,354 A | 5/1992 | Long |
| 5,465,221 A | 11/1995 | Merat et al. |
| 5,495,430 A | 2/1996 | Matsunari et al. |
| 5,552,995 A | 9/1996 | Sebastian |
| 5,570,291 A | 10/1996 | Dudle et al. |
| 5,655,087 A | 8/1997 | Hino et al. |
| 5,758,328 A | 5/1998 | Giovannoli |
| 5,847,971 A | 12/1998 | Ladner et al. |
| 5,870,719 A | 2/1999 | Maritzen et al. |
| 5,937,189 A | 8/1999 | Branson et al. |
| 6,031,535 A | 2/2000 | Barton |
| 6,112,133 A | 8/2000 | Fishman |
| 6,295,513 B1 | 9/2001 | Thackston |
| 6,341,271 B1 | 1/2002 | Salvo et al. |
| 6,343,285 B1 | 1/2002 | Tanaka et al. |
| 6,611,725 B1 | 8/2003 | Harrison |
| 6,647,373 B1 | 11/2003 | Calton-Foss |
| 6,701,200 B1 | 3/2004 | Lukis et al. |
| 6,750,864 B1 | 6/2004 | Anwar |

(Continued)

FOREIGN PATENT DOCUMENTS

| | | |
|---|---|---|
| WO | 154476 A2 | 8/2001 |
| WO | 171626 A2 | 9/2001 |

(Continued)

OTHER PUBLICATIONS

"Quartiles." Mathisfun.com. Web. <https://www.mathsisfun.com/data/quartiles.html>. Archive. <https://web.archive.org/web/20100909011751/http://www.mathsisfun.com/data/quartiles.html>, Sep. 9, 2010.

(Continued)

*Primary Examiner* — Tuan A Pham
*Assistant Examiner* — Thai V Dang

(57) ABSTRACT

A method for providing assistance to users of computer programs. The computer system receives user inputs for utilizing the various functions of a computer program. The system records an amount of time during which said user utilizes the respective functions, such that when a user signals that assistance is needed, the system determines which of the program's functions have been most frequently used. The system then finds, and connects to the user, persons having expertise in those respective areas.

15 Claims, 11 Drawing Sheets

(56) References Cited

U.S. PATENT DOCUMENTS

| | | | |
|---|---|---|---|
| 6,834,312 B2 | 12/2004 | Edwards et al. |
| 6,836,699 B2 | 12/2004 | Lukis et al. |
| 6,859,768 B1 | 2/2005 | Wakelam et al. |
| 6,922,701 B1 | 6/2005 | Ananian et al. |
| 6,917,847 B2 | 7/2005 | Littlejohn et al. |
| 7,006,084 B1 | 2/2006 | Buss et al. |
| 7,058,465 B2 | 6/2006 | Emori et al. |
| 7,079,990 B2 | 7/2006 | Haller et al. |
| 7,085,687 B2 | 8/2006 | Eckenwiler et al. |
| 7,089,082 B1 | 8/2006 | Lukis et al. |
| 7,123,986 B2 | 10/2006 | Lukis et al. |
| 7,134,096 B2 | 11/2006 | Brathwaite et al. |
| 7,299,101 B2 | 11/2007 | Lukis et al. |
| 7,305,367 B1 | 12/2007 | Hollis et al. |
| 7,327,869 B2 | 2/2008 | Boyer |
| 7,343,212 B1 | 3/2008 | Brearley et al. |
| 7,359,886 B2 | 4/2008 | Sakurai et al. |
| 7,366,643 B2 | 4/2008 | Verdura et al. |
| 7,369,970 B2 | 5/2008 | Shimizu et al. |
| 7,418,307 B2 | 8/2008 | Katircioglu |
| 7,467,074 B2 | 12/2008 | Faruque et al. |
| 7,496,487 B2 | 2/2009 | Wakelam et al. |
| 7,496,528 B2 | 2/2009 | Lukis et al. |
| 7,499,871 B1 | 3/2009 | McBrayer et al. |
| 7,523,411 B2 | 4/2009 | Carlin |
| 7,526,358 B2 | 4/2009 | Kawano et al. |
| 7,529,650 B2 | 5/2009 | Wakelam et al. |
| 7,565,139 B2 | 7/2009 | Neven, Sr. et al. |
| 7,565,223 B2 | 7/2009 | Moldenhauer et al. |
| 7,567,849 B1 | 7/2009 | Trammell et al. |
| 7,568,155 B1 | 7/2009 | Axe et al. |
| 7,571,166 B1 | 8/2009 | Davies et al. |
| 7,574,339 B2 | 8/2009 | Lukis et al. |
| 7,590,466 B2 | 9/2009 | Lukis et al. |
| 7,590,565 B2 | 9/2009 | Ward et al. |
| 7,603,191 B2 | 10/2009 | Gross |
| 7,606,628 B2 | 10/2009 | Azuma |
| 7,630,783 B2 | 12/2009 | Walls-Manning et al. |
| 7,656,402 B2 | 2/2010 | Abraham et al. |
| 7,689,936 B2 | 3/2010 | Rosel |
| 7,733,339 B2 | 6/2010 | Laning et al. |
| 7,747,469 B2 | 6/2010 | Hinman |
| 7,748,622 B2 | 7/2010 | Schon et al. |
| 7,761,319 B2 | 7/2010 | Gil et al. |
| 7,822,682 B2 | 10/2010 | Arnold et al. |
| 7,836,573 B2 | 11/2010 | Lukis et al. |
| 7,840,443 B2 | 11/2010 | Lukis et al. |
| 7,908,200 B2 | 3/2011 | Scott et al. |
| 7,957,830 B2 | 6/2011 | Lukis et al. |
| 7,979,313 B1 | 7/2011 | Baar |
| 7,993,140 B2 | 8/2011 | Sakezles |
| 8,000,987 B2 | 8/2011 | Hickey et al. |
| 8,024,207 B2 | 9/2011 | Ouimet |
| 8,140,401 B2 | 3/2012 | Lukis et al. |
| 8,170,946 B2 | 5/2012 | Blair et al. |
| 8,175,933 B2 | 5/2012 | Cook, Jr. et al. |
| 8,180,396 B2 | 5/2012 | Athsani et al. |
| 8,209,327 B2 | 6/2012 | Danish et al. |
| 8,239,284 B2 | 8/2012 | Lukis et al. |
| 8,249,329 B2 | 8/2012 | Silver |
| 8,271,118 B2 | 9/2012 | Pietsch et al. |
| 8,275,583 B2 | 9/2012 | Devarajan et al. |
| 8,295,971 B2 | 10/2012 | Krantz |
| 8,417,478 B2 | 4/2013 | Gintis et al. |
| 8,441,502 B2 | 5/2013 | Reghetti et al. |
| 8,515,820 B2 | 8/2013 | Lopez et al. |
| 8,554,250 B2 | 10/2013 | Linaker |
| 8,571,298 B2 | 10/2013 | McQueen et al. |
| 8,595,171 B2 | 11/2013 | Qu |
| 8,700,185 B2 | 4/2014 | Yucel et al. |
| 8,706,607 B2 | 4/2014 | Sheth et al. |
| 8,768,651 B2 | 7/2014 | Bhaskaran et al. |
| 8,798,324 B2 | 8/2014 | Conradt |
| 8,806,398 B2 | 8/2014 | Brathwaite et al. |
| 8,830,267 B2 | 9/2014 | Brackney |
| 8,849,636 B2 | 9/2014 | Becker et al. |
| 8,861,005 B2 | 10/2014 | Grosz |
| 8,874,413 B2 | 10/2014 | Mulligan et al. |
| 8,923,650 B2 | 12/2014 | Wexler |
| 8,977,558 B2 | 3/2015 | Nielsen et al. |
| 9,037,692 B2 | 5/2015 | Ferris |
| 9,055,120 B1 | 6/2015 | Firman |
| 9,106,764 B2 | 8/2015 | Chan et al. |
| 2001/0023418 A1 | 9/2001 | Suzuki et al. |
| 2001/0047251 A1 | 11/2001 | Kemp |
| 2002/0065790 A1 | 5/2002 | Oouchi |
| 2002/0087440 A1 | 7/2002 | Blair et al. |
| 2002/0099579 A1 | 7/2002 | Stowell et al. |
| 2002/0107673 A1 | 8/2002 | Haller et al. |
| 2002/0152133 A1 | 10/2002 | King et al. |
| 2003/0018490 A1 | 1/2003 | Magers et al. |
| 2003/0069824 A1 | 4/2003 | Menninger |
| 2003/0078846 A1 | 4/2003 | Burk et al. |
| 2003/0139995 A1 | 7/2003 | Farley |
| 2003/0149500 A1 | 8/2003 | Faruque et al. |
| 2003/0163212 A1 | 8/2003 | Smith et al. |
| 2003/0172008 A1 | 9/2003 | Hage et al. |
| 2003/0212610 A1 | 11/2003 | Duffy et al. |
| 2003/0220911 A1 | 11/2003 | Tompras |
| 2004/0008876 A1 | 1/2004 | Lure |
| 2004/0113945 A1 | 6/2004 | Park et al. |
| 2004/0195224 A1 | 10/2004 | Kanodia et al. |
| 2005/0055299 A1 | 3/2005 | Chambers et al. |
| 2005/0125092 A1 | 6/2005 | Lukis et al. |
| 2005/0144033 A1 | 6/2005 | Vreeke et al. |
| 2005/0171790 A1 | 8/2005 | Blackmon |
| 2005/0177355 A1* | 8/2005 | Makinouchi ............ G06F 17/50 703/13 |
| 2005/0251478 A1 | 11/2005 | Yanavi |
| 2005/0273401 A1 | 12/2005 | Yeh et al. |
| 2006/0085322 A1 | 4/2006 | Crookshanks |
| 2006/0185275 A1 | 8/2006 | Yatt |
| 2006/0253214 A1 | 11/2006 | Gross |
| 2007/0016437 A1 | 1/2007 | Elmufdi et al. |
| 2007/0067146 A1 | 3/2007 | Devarajan et al. |
| 2007/0073593 A1 | 5/2007 | Perry et al. |
| 2007/0112635 A1 | 5/2007 | Loncaric |
| 2007/0198231 A1 | 8/2007 | Walch |
| 2008/0120086 A1 | 5/2008 | Lilley et al. |
| 2008/0183614 A1 | 7/2008 | Gujral et al. |
| 2008/0269942 A1 | 10/2008 | Free |
| 2008/0281678 A1 | 11/2008 | Keuls et al. |
| 2009/0058860 A1 | 3/2009 | Fong et al. |
| 2009/0208773 A1 | 8/2009 | DuPont |
| 2009/0299799 A1 | 12/2009 | Racho et al. |
| 2009/0319388 A1 | 12/2009 | Yuan et al. |
| 2010/0049800 A1* | 2/2010 | Hatfield ............ G06F 9/4446 709/204 |
| 2010/0324956 A1* | 12/2010 | Lopez .............. G06F 17/5004 705/7.37 |
| 2011/0040542 A1 | 2/2011 | Sendhoff et al. |
| 2011/0047140 A1 | 2/2011 | Free |
| 2011/0209081 A1 | 8/2011 | Chen et al. |
| 2011/0213757 A1 | 9/2011 | Bhaskaran et al. |
| 2012/0016678 A1 | 1/2012 | Gruber et al. |
| 2012/0072299 A1 | 3/2012 | Sampsell |
| 2012/0230548 A1 | 9/2012 | Calman et al. |
| 2012/0316667 A1 | 12/2012 | Hartloff |
| 2013/0055126 A1 | 2/2013 | Jackson |
| 2013/0097259 A1 | 4/2013 | Li |
| 2013/0100128 A1 | 4/2013 | Steedly et al. |
| 2013/0138529 A1 | 5/2013 | Hou |
| 2013/0144566 A1 | 6/2013 | De Biswas |
| 2013/0166470 A1 | 6/2013 | Grala et al. |
| 2013/0218961 A1 | 8/2013 | Ho |
| 2013/0293580 A1 | 11/2013 | Spivack |
| 2013/0297320 A1 | 11/2013 | Buser |
| 2013/0297460 A1 | 11/2013 | Spivack |
| 2013/0311914 A1 | 11/2013 | Daily |
| 2013/0325410 A1 | 12/2013 | Jung et al. |
| 2014/0042136 A1 | 2/2014 | Daniel et al. |
| 2014/0067333 A1 | 3/2014 | Rodney et al. |
| 2014/0075342 A1 | 3/2014 | Corlett |
| 2014/0098094 A1 | 4/2014 | Neumann et al. |

(56) References Cited

U.S. PATENT DOCUMENTS

| | | | |
|---|---|---|---|
| 2014/0157579 | A1 | 6/2014 | Chhabra et al. |
| 2014/0207605 | A1 | 7/2014 | Allin et al. |
| 2014/0229316 | A1 | 8/2014 | Brandon |
| 2014/0279177 | A1 | 9/2014 | Stump |
| 2014/0379119 | A1 | 12/2014 | Sciacchitano et al. |
| 2015/0055085 | A1 | 2/2015 | Fonte et al. |
| 2015/0066189 | A1 | 3/2015 | Mulligan et al. |
| 2015/0127480 | A1 | 5/2015 | Herrman et al. |
| 2015/0206063 | A1* | 7/2015 | Santero .................... G06N 5/00 706/12 |
| 2015/0234377 | A1 | 8/2015 | Mizikovsky |

FOREIGN PATENT DOCUMENTS

| | | | |
|---|---|---|---|
| WO | 2001077781 | A2 | 10/2001 |
| WO | 2006086332 | A2 | 8/2006 |
| WO | 2007067248 | A2 | 6/2007 |
| WO | 2011139630 | A1 | 11/2011 |
| WO | 2011140646 | | 11/2011 |
| WO | 2011140646 | A1 | 11/2011 |
| WO | 2013058764 | A1 | 4/2013 |
| WO | 2014152396 | A2 | 9/2014 |

OTHER PUBLICATIONS

Wu et al. Interactive 3D Geometric Modelers with 2D UI, 2002, State University of Campinas, www.dca.fee.unicamp.br, Sao Paulo, Brazil; 2002, 8 pages.

"Upload Your Photos, Print a 3D Model with hypr3D." SolidSmack. http://www.solidsmack.com/cad-design-news/hypr3d-photo-video-3d-print/; last accessed on Oct. 13, 2015.

Rothganger et al. "3D Object Modeling and Recognition from Photographs and Image Sequences." Toward Category-Level Object Recognition. 2006, pp. 105-126, vol. 4170 of the series Lecture Notes in Computer Science. Springer Berlin Heidelberg.

Retrieved from:http://www.solidworks.com/sw/products/3d-cad/manufacturing-cost-estimation-quoting.htm p. 1: Automatic Manufacturing Cost Estimation Overview; Solidworks; 2015.

Retrieved from: http://www.gom.com/fileadmin/user_upload/industries/touch_probe_fixtures_EN.pdf; Application Example: Quality Control, Online Calibration and Validation of Fixtures, Jigs and Gauges. GOM mbH, 2008.

http://citeseerx.ist.psu.edu/viewdoc/download?doi=10.1.1.194. 7785&rep=rep1&type=pdf Kim, Jin Baek, and Arie Segev. "A web services-enabled marketplace architecture for negotiation process management." Decision Support Systems 40.1 (2005): 71-87.

Jaiswal, Ashutosh et al., "Design and Implementation of a Secure Multi-Agent Marketplace", Elsevier Science, pp. 1-23, Jun. 3, 2004; http://magnet.cs.umn.edu/papers/Jaiswal04cera.pdf.

http://www.computer.org/csdl/proceedings/hicss/2005/2268/01/22680038.pdf Bui, Tung, and Alexandre Gachet. "Web services for negotiation and bargaining in electronic markets: Design requirements and implementation framework." System Sciences, 2005. HICSS'05.

http://www.bridgelinedigital.com/File%20Library/Repository/eCommerce/Sample-eCommerce-RFP-Template_Bridgeline-Digital.pdf. Sample RFP Template: Ecommerce Platform, Bridgeline Digital, 2014.

Matchbook, Tealbook, http://www.matchbookinc.com/ Sep. 28, 2015.

3Diligent, Source Smarter, http://www.3diligent.com/customer.html; Sep. 28, 2015.

Dassault Systemes, Brochure, Mar. 24, 2010: New Features Type3ToCatia http://www.type3.us/content/download/2202/405535/file/New%20Feature_Type3ToCatia_2010_US%20old.pdf.

Xue, S., X. Y. Kou, and S. T. Tan. "Natural voice-enabled CAD: modeling via natural discourse." Computer-Aided Design and Applications 6.1 (2009): 125-136.

Kou, X. Y., S. K. Xue, and S. T. Tan. "Knowledge-guided inference for voice-enabled CAD." Computer-Aided Design 42.6 (2010): 545-557.

Sharma, Anirudh, et al. "MozArt: a multimodal interface for conceptual 3D modeling." Proceedings of the 13th international conference on multimodal interfaces. ACM, 2011.

Sorpas ("User Manual,", Swanted Software and Engineering Aps, 2011 (120 pages)).

U.S. Appl. No. 14/267,447, filed Aug. 5, 2015, Office Action.
U.S. Appl. No. 14/197,922, filed Nov. 26, 2014, Office Action.
U.S. Appl. No. 14/197,922, filed Apr. 27, 2015, Response to Office Action.
U.S. Appl. No. 14/197,922, filed May 15, 2015, Office Action.
U.S. Appl. No. 14/267,447, filed Jun. 18, 2015, Response to Office Action.
U.S. Appl. No. 14/263,665, filed Oct. 8, 2015, Office Action.
U.S. Appl. No. 14/053,222, filed Jan. 29, 2016, Office Action.
U.S. Appl. No. 14/311,943, filed Apr. 27, 2016, Office Action.
U.S. Appl. No. 14/486,550, filed May 26, 2016, Office Action.
U.S. Appl. No. 14/060,033, filed Jun. 15, 2016, Office Action.
U.S. Appl. No. 14/172,462, filed Jul. 6, 2016, Office Action.
U.S. Appl. No. 14/053,222, filed Jul. 29, 2016, Response to Office Action.
U.S. Appl. No. 14/185,204, filed Jul. 29, 2016, Office Action.
U.S. Appl. No. 14/062,947, filed Sep. 16, 2016, Office Action.
U.S. Appl. No. 14/060,033, filed Oct. 22, 2013.
U.S. Appl. No. 14/053,222, filed Oct. 14, 2013.
U.S. Appl. No. 14/172,462, filed Oct. 16, 2013.
U.S. Appl. No. 14/062,947, filed Oct. 25, 2013.
U.S. Appl. No. 14/172,404, filed Feb. 4, 2014.
U.S. Appl. No. 14/303,372, filed Jun. 12, 2014.
U.S. Appl. No. 14/185,204, filed Feb. 20, 2014.
U.S. Appl. No. 14/195,391, filed Mar. 3, 2014.
U.S. Appl. No. 14/246,254, filed Apr. 7, 2014.
U.S. Appl. No. 14/229,008, filed Mar. 28, 2014.
U.S. Appl. No. 14/197,922, filed Mar. 5, 2014.
U.S. Appl. No. 14/263,665, filed Apr. 28, 2014.
U.S. Appl. No. 14/267,447, filed May 1, 2014.
U.S. Appl. No. 14/311,943, filed Jun. 23, 2014.

* cited by examiner

| Action/Expertise Database | | |
|---|---|---|
| Action | Expertise | Modifier |
| Idle | (previous action) | 0.5 |
| Place Bend | Bending | 1 |
| Cut Sheet | Cutting | 1 |
| Place Weld | Welding | 1 |
| Activate Undo button | (previous action) | 2 |
| Change Material (Aluminum) | Material | 1 |
| Change Material (Stainless Steel) | Material | 1 |
| Open "Decorative" menu | Aesthetic | 1 |
| Select plating option | Plating | 1 |

FIG. 6A

Design State Database 250

| Action | Time Stamp | Expertise Area | Time Spent | Multiplier | Running 10-minute Total |
|---|---|---|---|---|---|
| Begin | 11:50:55 | N/A | N/A | N/A | N/A |
| Create sheet | 11:55:59 | Material | 0:00:05 | 1 | N/A |
| Cut sheet | 11:59:30 | Cutting | 0:00:10 | 1 | N/A |
| Cut sheet | 12:01:01 | Cutting | 0:00:46 | 1 | 0:00:46 |
| Cut sheet | 12:01:25 | Cutting | 0:00:24 | 1 | 0:01:10 |
| Cut sheet | 12:01:59 | Cutting | 0:00:34 | 1 | 0:01:44 |
| Place Bend | 12:03:15 | Bending | 0:01:16 | 1 | 0:01:16 |
| Place Bend | 12:03:19 | Bending | 0:00:04 | 1 | 0:01:20 |
| Place Bend | 12:03:25 | Bending | 0:00:06 | 1 | 0:01:26 |
| Place Bend | 12:03:55 | Bending | 0:00:30 | 1 | 0:01:56 |
| Place Weld | 12:05:05 | Welding | 0:01:10 | 1 | 0:01:10 |
| Undo | 12:05:10 | Welding | 0:00:05 | 2 | 0:01:20 |
| Place Weld | 12:06:00 | Welding | 0:00:50 | 1 | 0:02:10 |
| Undo | 12:06:15 | Welding | 0:00:15 | 2 | 0:02:40 |
| Place Weld | 12:06:25 | Welding | 0:00:10 | 1 | 0:02:50 |
| Place Weld | 12:06:55 | Welding | 0:00:30 | 1 | 0:03:20 |
| Place Weld | 12:07:05 | Welding | 0:00:10 | 1 | 0:03:30 |
| Undo | 12:07:10 | Welding | 0:00:05 | 2 | 0:03:40 |
| Place Weld | 12:07:30 | Welding | 0:00:20 | 1 | 0:04:00 |
| Undo | 12:07:37 | Welding | 0:00:07 | 2 | 0:04:14 |
| Idle | 12:08:50 | Welding | 0:01:13 | 0.5 | 0:04:50 |
| Place Weld | 12:09:15 | Welding | 0:00:25 | 1 | 0:05:15 |
| Undo | 12:09:27 | Welding | 0:00:12 | 2 | 0:05:39 |
| Help Center | 12:09:55 | Help Center | 0:00:28 | 1 | 0:00:28 |

FIG. 6B

Please Select Areas in which you would like Assistance:

Primary  Secondary

☐  ☐  Welding (5:39 elapsed)

☐  ☐  Bending (1:56 elapsed)

☐  ☐  Cutting (1:44 elapsed)

☐  ☐  Other [Pulldown Menu of Other Expertise Areas]

[Submit]

| Expert Database 270 | | | | | | | | | |
|---|---|---|---|---|---|---|---|---|---|
| Expert | Available Y/N? 801 | Bending Y/N? 802 | Bending Expertise Score 804 | Cutting Y/N? 805 | Cutting Expertise Score 806 | Welding Y/N? 807 | Welding Expertise Score 808 | Restrictions 810 |
| Baker | Y | Y | 5 | Y | 4 | Y | 6 | TIG Welding |
| Daniels | Y | Y | 2 | N | 0 | Y | 6 | |
| Fisher | Y | N | 0 | Y | 7 | Y | 7 | |
| Ford | Y | N | 0 | Y | 5 | Y | 9 | Aluminum |
| Hamill | Y | Y | 1 | N | 0 | Y | 3 | Laser Cutter |
| Jones | N | N | 0 | Y | 3 | Y | 2 | Laser Cutter |
| Mayhew | Y | Y | 4 | Y | 8 | Y | 9 | |
| Prowse | Y | Y | 9 | Y | 5 | N | 0 | Laser Cutter |

FIG. 8

SYSTEMS AND METHODS FOR AUTOMATED HELP

FIELD OF THE INVENTION

The present invention generally relates to the field of computer-aided design (CAD). In particular, the present invention is directed to a method and associated apparatus to enable automated help with use of a CAD design tool.

BACKGROUND

Computer-Aided Design (CAD) programs are typically utilized to create, model, and optimize the design an product or article for subsequent manufacture, typically by rendering a 3D surface representation of the designed product. CAD tools typically include a user interface for enabling a user to input design requirements, constraints, required performance criteria, testing criteria, and required elements or materials.

Systems to provide help to users of software products are known in the industry. One is the menu-driven help system in applications such as Microsoft Word, in which a user reads through a menu of search topics to find applicable information, by either reviewing an index of help topics or by entering key words that search the index and specific help information to find applicable content.

Another utility to provide general assistance is Ask.com. Ask.com includes a utility with a Q&A community, in which specific questions on general topics can be submitted to groups of experts in those general topics. See http://www.ask.com/answers/browse?qsrc=321&qo=channelNavigation&o=0&1=dir, last visited Jun. 12, 2014.

Finally, remote help systems are also known by which computer support technicians can access users' computers remotely in order to provide support. See for example http://www.apextechservices.com/it-consulting/gl10202013.aspx?gclid=COvK27np274CFc9 xOgodeBcAig, last visited Jun. 12, 2014.

Accordingly, while prior art exists for providing remote technical support, that technical support relies on either static menus, or relies on users to articulate their questions in a form understandable to the help system. A need has arisen in the art for help systems that do not rely on static menus or user help request articulation.

SUMMARY OF THE DISCLOSURE

An embodiment of the invention comprises causing a computer system to receive user inputs for utilizing a plurality of functions of a computer program, causing a computer system to record an amount of time during which the user utilizes each of the plurality of functions, causing a computer system to receive an indication from a user that assistance is requested, causing a computer system to compare the respective amounts of time the user utilizes each of the plurality of functions to one another, to identify which of the plurality of functions have been most frequently used, and based on the identified most frequently used ones of said plurality of functions, causing a computer system to identify expertise to provide assistance to the user.

Another embodiment of the invention comprises a computer readable medium storing machine-executable instructions including a plurality of modules that are executed by a processor of a computer system, the instructions when executed by the processor causing the computer system to execute a method comprising receiving user inputs for utilizing a plurality of functions of a computer program, recording an amount of time during which said user utilizes each of the plurality of functions, receiving an indication from a user that assistance is requested, comparing the respective amounts of time the user utilizes each of said plurality of functions to one another, to identify which of the plurality of functions have been most frequently used, comparing identified most frequently used ones of the plurality of functions to an indication of expertise of a plurality of experts in the most frequently used ones of the plurality of functions, and identifying a selected one of the plurality of experts having a relatively high indication of expertise in the most frequently used ones of the plurality of functions.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 6A is a table mapping actions to associated expertise areas that is used in step 410 of FIG. 4;

FIG. 6B is a table illustrating the data stored by design state database 250 resulting from step 425 of FIG. 4;

FIG. 7 is a diagram of a screen display for step 515 of FIG. 5;

FIG. 8 is a table of the expert listings and associated information in accordance with an embodiment of the invention;

DETAILED DESCRIPTION

In the description to follow, flowcharts are used to indicate the methods in accordance with a first embodiment of the invention. These flowcharts indicate corresponding sequences of computer code that accomplish the depicted method steps.

The invention could be embodied in one of several ways. All of the code modules could be written in any computer language, such as Java or C++. Alternatively, the code modules of the invention could be embedded within an existing 3D CAD/CAM program, such as SolidWorks, AutoCAD, zwCAD from ZWCAD Software Co, TurboCAD from IMSI/Design LLC, or others. If the code modules are separately programmed, they can interact with a CAD product through its application program interface (API). Any code modules of the invention that are integrated into an existing CAD product would be written in an applicable programing language for CAD products, such as LISP.

Herein, a "structure" (or the "product" that is designed) may be any object or part having a particular geometry. A 3D computer "model" may be a virtual representation of a structure and may be created using an appropriate CAD program, such as those set forth above. A "designer" or "user" may be the designer of a 3D computer model, a purchaser, an agent of the purchaser, a consumer, a home user, or a customer, among others. Examples of a structure include a piece of sheet metal, a solid cube, a cylindrical pipe, an injection molded plastic toy, an article of clothing such as a shirt made of cotton, and an assembly of various parts such as a vehicle, among others. A project (or design) may refer to a CAD model of a part or an assembly of CAD models of parts that may be a virtual representation of a particular structure and may be created using one or more appropriate CAD programs.

Figure 1:
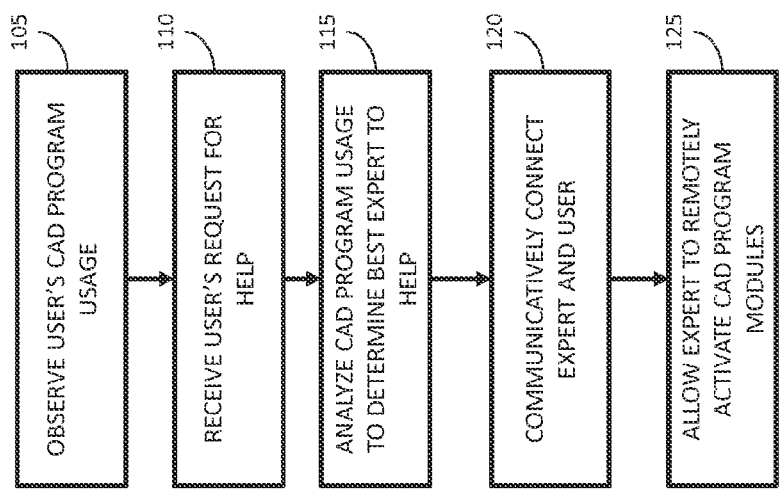
FIG. 1 is a high level flowchart of the method of an embodiment of the invention.

FIG. 1 provides a high level flowchart of the operation of a first embodiment of the invention. While an embodiment of the invention will be described in further detail below, this high level description is provided for ease of understanding. In step 105, the program modules of the invention monitor and store information pertaining to a user's recent interaction with a CAD tool. As will be set forth in more detail below, the gathered information includes the length of time the user spends accessing a particular utility within the CAD program. In step 110, a user transmits a request for help. In step 115, the usage information gathered in step 105 is analyzed to determine which expert is best suited to provide help to the user. As will be described in more detail below, that determination includes assessing where the user has spent most of her time, then the next most amount of time, etc. so she can select particular areas for assistance. In step 120 a connection is established between the expert chosen in step 115 and the user.

Figure 2:
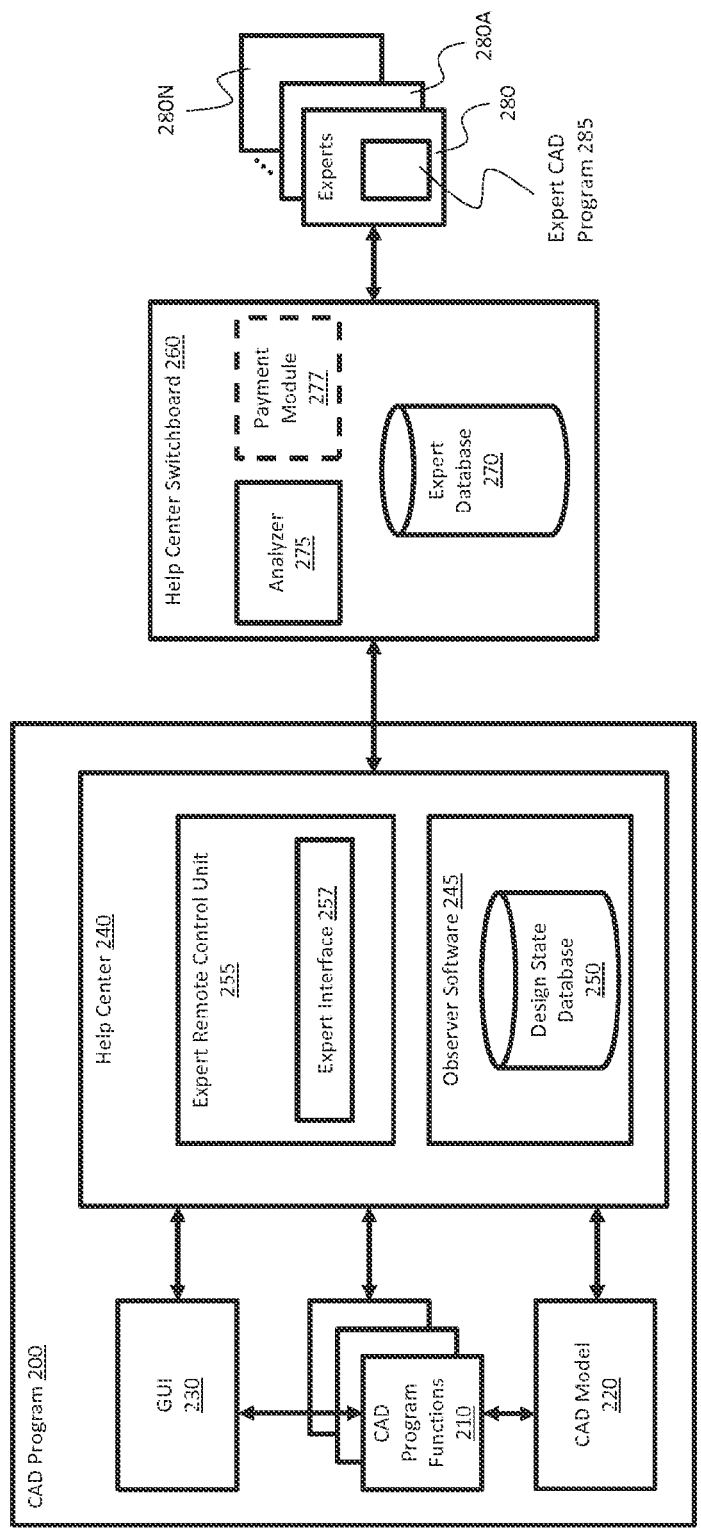
FIG. 2 is a block diagram of program modules of various embodiments of the invention.

FIG. 2 is a block diagram of the program modules of the invention. In the description to follow, reference is made to "blocks" of computer program code, or modules of code. It is to be understood that the reference to separate "modules" is for ease of illustration and discussion. As a practical matter, the program code instantiating the invention could be organized in any one of a number of well-known manners to provide the functions described. While it is possible that separate code modules could be created to achieve the separate functions described, that is not required. So for example, we make reference below to a "help center module" 240 and to a "help center switchboard module" 260. While described separately, in practice the actual modules of code instantiating the functions described for those separate modules could be intermingled . . . they do not have to be separate and independent sequences of code.

As set forth above, the invention can be designed as either a standalone program that operates a separate CAD program through its APIs, or can be integrated into a conventional CAD program such as those listed above. In the invention CAD program 200 includes conventional CAD functions modules 210 that are typically found in commercial CAD programs, enabling the design of one or more objects. As a result the conventional CAD functions 210 produce a CAD model 220 of the object to be designed. The CAD model 220 includes conventional information (such as composition, object dimensions, surface bends, welds, and the like). The user interacts with and controls the conventional CAD functions modules (hereinafter "CAD program functions" or "CAD functions" 210), to in turn manipulate the resultant CAD model 220, through graphical user interface (GUI) 230.

In the invention, a help center module 240 is provided to enable automated help intervention. As will be described in more detail below, the help center module 240 includes an observer software module 245 that reads and records recent interactions between the user (via GUI) 230 and the conventional CAD program functions 210. As will be described in more detail below, the observer software module 245 includes a design state database 250 that records changes and updates to the CAD model 220. The design state database (as well as all the other databases described herein) can be any commercial relational database product, such as DB2 from IBM or Oracle Database 12c, that can store the information and related tables of information described, and can be either directly a part of the CAD program 200 (as shown), or accessed by the program modules of the invention remotely (such as in a cloud service environment).

The help center module 240 further includes an expert remote control unit module 255, which in turn includes an expert interface 257. The expert remote control unit module 255 enables experts to remotely access the CAD program 200, through the expert interface 257. In a preferred embodiment of the invention the expert interface 257 is part of the GUI 230 by which the user interacts with CAD program 200. The expert interface is shown in FIG. 2 as being part of the expert remote control unit module 255 because it is accessed by the expert that is selected by the switchboard module 260.

The invention further includes a help center "switchboard" module 260, which utilizes the output of the design state database 250 to select an expert from the expert database 270 who has listed credentials that are similar to the user's requirements for assistance as indicated by the help center module 240. As a result, an appropriate expert 280 is selected, and a connection is established between the user and expert 280 by any one of a number of known communication technologies (such as, by way of example and not limitation, video chat such as Skype; landline telephone connection; cellphone/smartphone connection; emails; instant messages, and communications over social media portals such as Facebook and Twitter). The help center switchboard module 260 further includes an analyzer module 275, and an optional payment module 277. As will be described in more detail below, the analyzer module 275 compares the output of the design state database 250, as well as (optionally) inputs from the user via GUI 230 and the CAD model itself 220, to the entries in the expert database 270, so as to determine which expert 280-280N should be selected to provide support to the user. Finally, as described in more detail below, each of the experts 280-280N may have their own version of CAD program 200 for entering information into the CAD model 220, while interacting with the user (for example, so that the expert can explain her recommended changes to the CAD model 220) through the expert interface 257.

Figure 3:
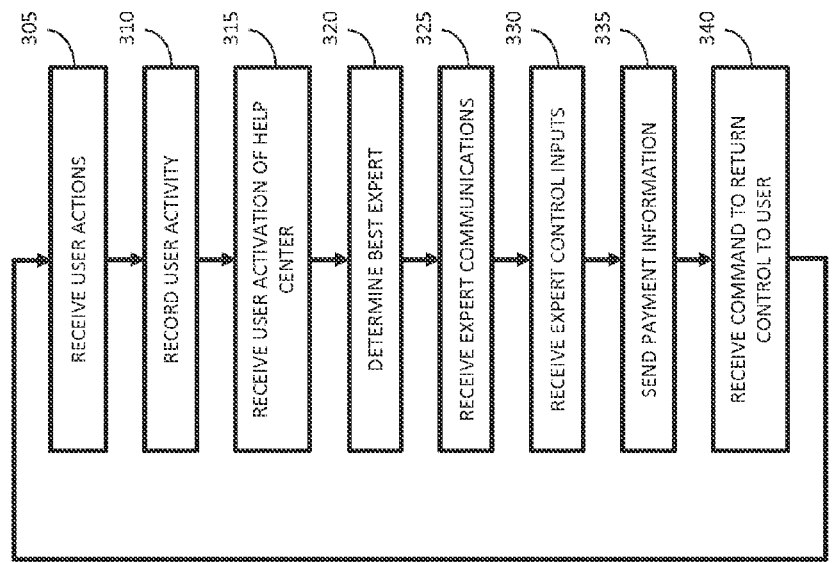
FIG. 3 is a more detailed flowchart of the method in accordance with an embodiment of the invention.

With reference to FIG. 3, a more detailed flowchart of the method of the invention as set forth in FIG. 1 will now be described. The process starts with step 305, in which the user enters commands to the control the CAD functions 210, so as to build the CAD model 220. The observer software module 245 receives those inputs, and in step 310 a record of those inputs is created in the design state database 250. In step 315 the user indicates that she wants to invoke the help utility, which prompts the help center module 240 to read out the entries of the design state database 250 for the article under design to the analyzer module 275 of the help center switchboard module 260.

As previously stated, and as will be described in more detail below with reference to FIG. 5, in step 320 the analyzer module 275 compares the outputs of the design state database 250 to corresponding entries in the expert database 270, to determine which expert best matches up to the likely subjects of the help request from the user. In step 325 communications are initiated with the applicable expert 280, by enabling them through their expert CAD program 285 and the expert remote control unit module 255 to (under step 330) control the CAD program functions 210 remotely, so as to manipulate the CAD model 220 directly, while also enabling the expert 280 to interact with the user through expert interface 257. Optionally, in step 325, the payment module 277 enables payment by the user for the support services of the expert 280, which can be completed prior to, or after, the provision of support services. Payment can be in the form of an upfront fee, or based on the amount of time the expert spends providing help, some combination of upfront fee and time billing, or some other basis agreed to by the user. The payment module 277 is of the conventional type that enables ecommerce payments using credit cards, PayPal, and the like. Finally, in step 340, when the expert 280 completes providing services to the user, the expert terminates the help session, and the invention returns full control over the CAD program functions 210 and the resultant CAD model 220 to the user, such that the process starts again at step 305. The invention enables the user to terminate the help session at any time by so indicating at the GUI 230.

Figure 4:
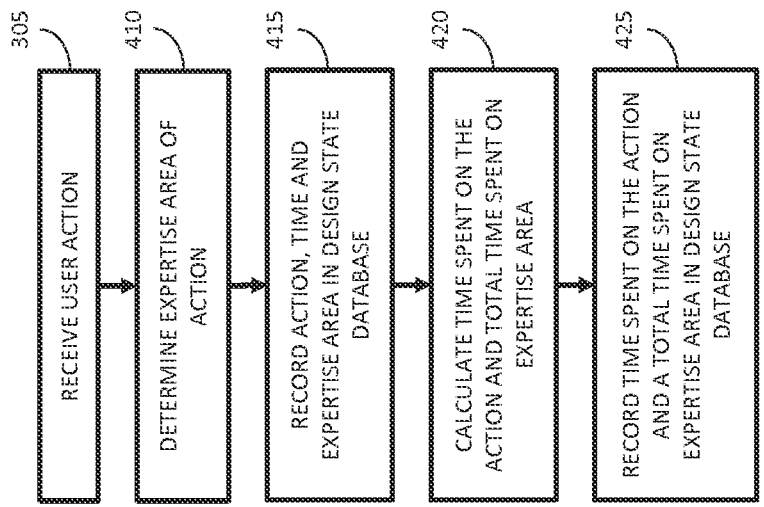
FIG. 4 is a more detailed flowchart of the steps executed in step 310 of FIG. 3.

FIG. 4 is a more detailed flowchart of the steps taken by the program modules of the invention in carrying out step 310 of FIG. 3. As in FIG. 3, the process starts with step 305, where the user inputs are received to control the various CAD program functions 210.

In step 410 the expertise area of the associated action is characterized by the observer software module 245, and recorded by observer software module 245 into the design state database 250. As shown in FIG. 6A, in the invention the various specifications and manufacturing procedures supported by the CAD system (such as "Cut Sheet" and "Place Weld") 602 are categorized into functional groups 604 that share a common technology and expertise. For the sake of speed, this action/expertise categorization table of FIG. 6A is stored in the design state database 250. Note that it could be stored elsewhere. By way of example, all the steps relating to material selection (such as steps 602A and 602B) are categorized as relating to the group "Material" expertise area in column 604. As will be apparent to those of skill in the art, the design state database 210 would include the names of a variety of expertise areas associated with CAD designs; what is shown in FIG. 6A is simply an example. Moreover, while the table shown in FIG. 6A only shows a single expertise area for each action, multiple expertise areas could be indicated, depending on factors such as preceding steps.

FIG. 6A also shows an assigned weighing factor 606 for each action. The weighing factors are added to given greater emphasis in the determinations set forth below for actions that are more likely to be the basis for a help request. So for example, step 602C "Activate Undo button" is assigned a weighing factor (or modifier) 606 of "2," on the rationale that any "Undo" action indicates that the user is undoing a previous action, which indicates a likelihood that the user made a mistake and may seek help. Likewise, an "Idle" action is relatively unlikely to result in a user help request, so as shown in row 602D it is assigned a weighing factor 606 of "0.5." In an alternate embodiment of the invention, an Idle action could be assigned a "2" if it occurs for less than a minute (because that may indicate the user is confused about the operation of the applicable function of the program) and a "0.5" if it occurs for more than a minute (on the rationale that a longer period indicates disengagement from the program due to some interruption). Note that the assignment of particular weighing factors to particular actions (both the absolute numbers assigned, and how they differ between particular actions) is a matter of design choice. Note also that while in the description above the modifiers 606 are determined solely by the action 602, they could also be determined by the expertise area 604, or by some combination of 602 and 604.

Therefore, in this step 410, the observer software module 245 compares incoming user actions from GUI 230 and the CAD program functions 210 to the database shown in FIG. 6A to assign applicable expertise areas for each user action. In step 415, as shown in FIG. 6B, the actions 612 and their assigned expertise areas 614 and weighing factors 616, along with a "time stamp" of when each action was taken 620, is entered into the design state database 250. Then, in step 420 and with further reference to FIG. 6B, the total amount of time 622 spent by the user undertaking each action is calculated by the help center module 240, along with a running total 624 of the total amount of time spent by the user on each action, which factors in the assigned weighing factor 616. Finally, in step 425 the calculated time spent 622 and running total 624 are written in to the design state database 250 by the help center module 240.

FIG. 6B shows the information as recorded in the design state database 250 as a result of step 425. In an embodiment of the invention, the running total 624 is recorded for each expertise area only for so long as a user request for help is not received, or for a continuous ten minute period, whichever is longer. In the particular example shown in FIG. 6B, the actions beginning at "Cut Sheet" 620A and ending with "Help Center" at 620B were recorded, because they all occurred within ten minutes of the time the user requested help at step 620B. The rationale for recording not more than ten minutes of activity is that it is far more likely for a user to need help for actions undertaken in the immediately previous ten minutes than for longer periods of time. As will be apparent to workers of skill in the art, the selection of ten minutes is a matter of design choice; shorter or longer periods could be selected, particularly if over time a trend develops of users seeking assistance for actions taken more than or less than ten minutes prior to seeking help.

Note also that the running total calculated running time shown in column 624 includes two other aspects, the multiplier/weighing factors 616 and certain actions for which running time is not assigned. As shown most clearly with action 620C, the actual time spent was five seconds, yet the calculated running time associated with that action is ten seconds. That is because the help center module 240 multiplies the time spent for each action in 622 by the multiplier (or weighing factor) 616 for that action, and the resultant is included in the calculated running total 624. Note that while an embodiment of the invention adds weighing factors to the running total calculation, and discounts one or more steps from the running totals, it is to be understood that the invention can be practiced without applying one or both of those aspects, and for example the invention could calculate running time solely as a function of the time spent on each action, or by only adding the weighing factors, or by only discounting certain steps.

Figure 5:
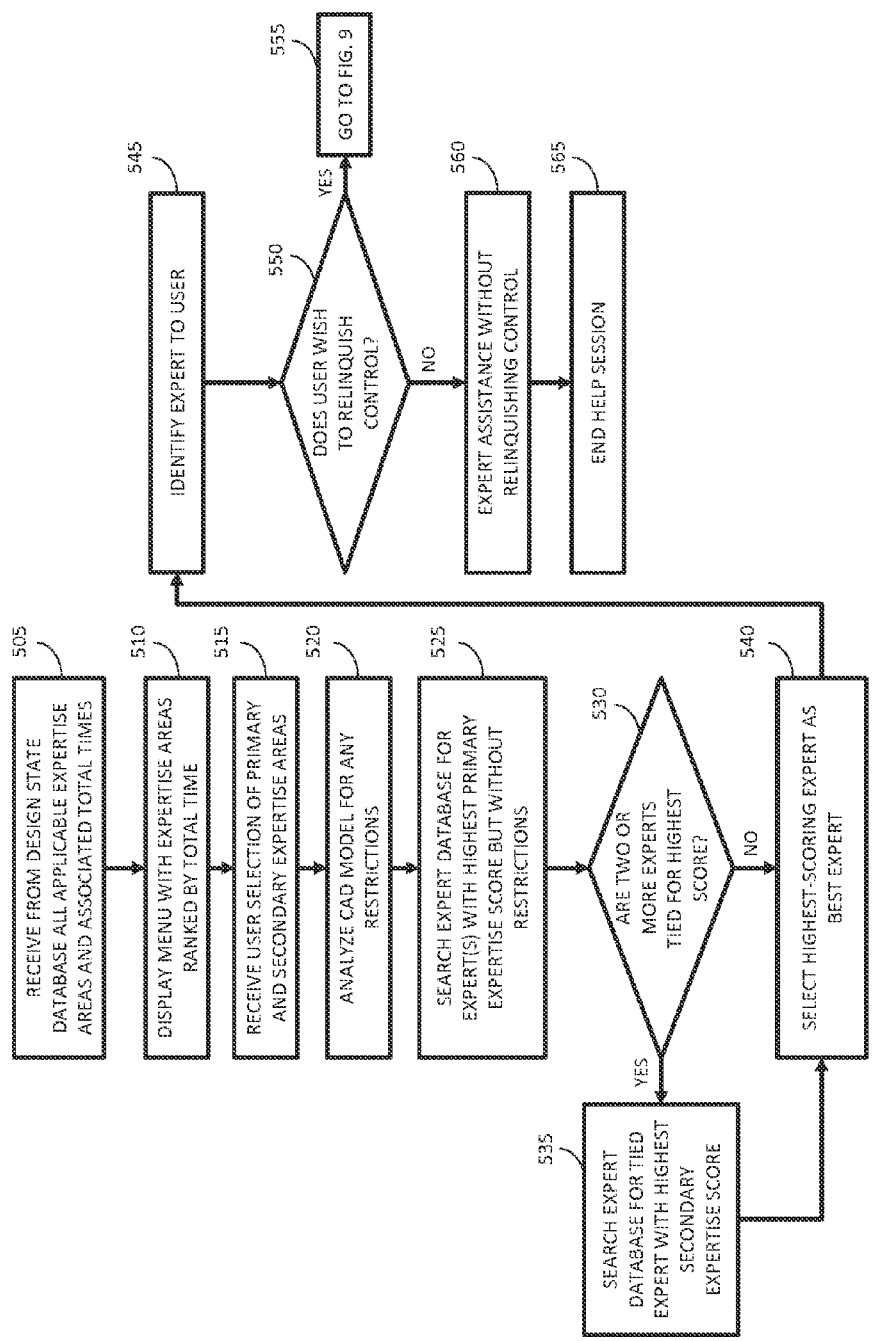
FIG. 5 is a more detailed flowchart of the steps executed in step 320 of FIG. 3.

With reference to FIG. 5, a more detailed description will now be provided of step 320 of FIG. 3. In step 505, when a user requests help as set forth in step 315 of FIG. 3 (and as reflected by the "Help Center" action 620B in FIG. 6B), the help center module 240 reads the design state database 250 for data recorded from the last "begin" action (e.g. 620D of FIG. 6B), or within ten minutes in running time from the "Help Center" action 620B, whichever is shorter. The help center module 240 then lists all the different expertise areas applicable to actions applied toward the calculated running time (as previously discussed, some actions can be discounted from the running time calculation), and determines a summation of the portions of the total running time during which the given expertise areas were applicable (which also includes factoring in the weighing factors for particular actions taken in given expertise areas). So, for the example shown in FIG. 6B, based on the recording of running time expired time help center module 240 would determine that the "Welding" expertise area was applicable to actions undertaken for five minutes, thirty nine seconds of running time; the "Bending" expertise area was applicable to actions undertaken for one minute, fifty six seconds of running time; and the "Cutting" expertise area was applicable to actions undertaken for one minute, forty four seconds of running time.

In step 510, the help center module 240 presents the resultant data to the user for selection of help topics. A schematic view 700 of the GUI 230 screen providing that information to the user is shown in FIG. 7. The user is given the option of selecting the expertise area for which information is sought. Here, the areas are listed in order of decreasing running time; as a practical matter they could be listed in any order. The calculated portions of total running time applicable to each expertise area is listed for the convenience of the user; as a practical matter that information does not have to be shown. The screen 700 also includes the option of designating the expertise areas as "primary" or "secondary;" that information is used to select experts, as will be described in more detail below. Finally, the screen includes the option of selecting areas of expertise other than those listed. In an embodiment of the invention the other areas are selectable from a pulldown menu (where the user clicks to see all the options, and then selects from the listed options) that lists all the expertise areas for the applicable CAD tool; as a practical matter any way of showing the information could be used, use of a pulldown menu is not mandatory. So for example the help center module 240 would populate the pulldown for the "Other" option with the expertise areas shown in FIG. 6A. In that embodiment the information could be pre-populated as the expertise areas are originally assigned, rather than waiting for the help center module to calculate the data in step 510. In an alternate embodiment of the invention the specifically listed expertise areas would be only the two with the most running time, and all the other expertise areas applicable to the actions undertaken during the applicable time period discussed above would be presented as selections in the pulldown menu. In this embodiment the pulldown menu would only be populated when the help center module 240 carries out step 510. As a result, in step 515 the user provides her selection to help center module 240, and that selection is provided to analyzer module 275 of help center switchboard module 260. Finally, it should be understood that while in this embodiment of the invention the user is presented with an option to select the help topic, the invention could also be practiced without presenting this option to the user; the process could skip steps 505 and 515, and simply provide the resultant of step 505 to analyzer module 275 of help center switchboard module 260.

Continuing with a description of the method of FIG. 5, prior to initiating the analysis to determine the best expert to contact, as an optional step 520 the method of the invention queries the CAD model 220 for attributes of the object to be manufactured, and includes that data along with the data discussed above to the analyzer module 275 of the help center switchboard module 260. These attributes include the type of material used, the type of weld, and other specific characteristics of the designed object associated with the expertise areas discussed above. As will be described in more detail below, these attributes are compared to "restrictions" listed in the data accompanying particular experts, to help determine if an otherwise-eligible expert would not be suited to provide assistance for the designed object in question. While this optional step has been described with reference to applying the attribute information against a list of "restrictions" of the experts, it is to be understood that it could also be applied to a list of "high expertise" technologies that would make a given expert an even better choice to provide help support.

In step 525, the analyzer module 275 of the help center switchboard module 260 carries out a search on the expert database 270, looking for experts that have expertise in at least the primary expertise area as indicated either by the user (by virtue of the selection in step 515) or by the calculations from help center module 240 (by determining the expertise area with the highest total running time), as well as (optionally) looking for such experts that do not have "restrictions" on their expertise that would render them inapplicable due to the attributes of the CAD model 220 as discussed above.

FIG. 8 presents an example of the listings of experts in the expert database 270. The rows reflect particular data for each expert. Column 801 lists whether the expert is immediately available; a "N" entry means the expert is away, or working on another project, or is otherwise unable or unwilling to provide immediate assistance. In an embodiment of the invention this information is provided on a real-time basis by the experts; it is to be understood that the information could be updated on a daily or some other periodic, or non-periodic, basis. In an alternate embodiment of the invention, the expert could list usual hours of availability. In another alternate embodiment of the invention, the "Y" could also designate whether or not the expert has signed an agreement under which, amongst other things, she is obligated herself to maintain the confidentiality of information exchanged with the user in providing assistance, and to assign any inventions arising from the engagement. In an alternate embodiment of the invention the Y/N designation does not reflect this information/status, because all the experts have to agree to such terms in order to be listed. In yet another alternate embodiment of the invention, once an expert is designated, the user is provided an opportunity to establish appropriate contractual terms with the expert, before proceeding with an exchange of technical information.

In FIG. 8, column 804 indicates an "expertise score" for each expert for the bending expertise area; columns 806 and 808 present similar scores for the cutting and welding expertise areas, respectively. Column 801 indicates whether the expert has any expertise in the bending expert area; not the correlation between "N" entries in column 802 and the "0" entries in column 802. Column 805 indicates whether the expert has any expertise in the cutting expertise area (correlating to the respective expertise indicators in column 806), and column 807 indicates whether the expert has any expertise in the welding expertise area (correlating to the respective expertise indicators in column 808). Note that while all of the "N" entries in columns 802, 805, 807 correlate to "0" entries in columns 804, 806, 808, respectively, as a practical matter an "N" entry could be used to designate low expertise for an expertise score other than "0", such as for example less than 20.

In the invention, some sort of quantitative indication is provided indicating the relative expertise of the listed experts in all of the expertise areas listed in FIG. 6A (only three of such areas are listed in FIG. 8 solely for the purpose of ease of illustration). These relative quality indications . . . or rankings . . . can come from a number of sources. Preferably, the rankings are based on feedback from previous requesters of help in the expertise area in question, and for that reason are articulated on a scale of 1-10. But other alternatives can be used. The rankings could be based on results from an independent testing agency. Or they could be based on more subjective factors, such as the number of juried publications from the expert, or the number of years of experience. Yet another is a combination of any one or more of the options listed above. For example, the rankings could be determined by a combination of objective factors (number of years of experience in the expertise area, and number of pertinent juried publications), and subjective factors (like customer feedback on a 1-10 scale). Moreover, while a 0-10 scale is used here (where 0 means no expertise, and 10 means extremely high expertise), any other relative scale could be used.

Finally, the database table includes listings of restrictions 810. So for example while expert Baker has provided expertise in welding (as indicated by his score of 6), he does not work on tungsten inert gas (TIG) welding. So if the CAD model 220 indicates that type of welding is used, Baker will not be chosen even if his expertise score would otherwise indicate that he is suitable. Optionally, other information could be provided in column 810 on what a given expert will (or will not) provide support for.

Then, as a result of step 520, the analyzer module 275 of help center switchboard module 260 determines the best expert to provide help, based on the highest expertise score for the desired expertise area, and availability (and optionally, whether or not the expert would be disqualified because a restriction 810 is applicable for the desired expertise area). In step 530, the analyzer module 275 determines if there is a tie between designated experts. If there is no tie, the highest ranked expert is designated in step 540. If there is a tie, in step 535 the analyzer module searches the expert database 270 to compare the relative expertise of the tied experts for the next most important expertise area. This second expertise area is either indicated by the user (in step 515 and as shown in and described with reference to FIG. 7), or is calculated by the help center module 240 to identify the expertise area with the second highest total time associated with it (as described above). So, in the example shown in FIG. 8, if the primary expertise area was "Welding," the result of step 520 would be to select both Ford and Mayhew, since they both have a score of "9" in column 808. In this step 530, if the "Cutting" expertise area is the secondary expertise area for which help may be needed, the scores of Ford (5) and Mayhew (8) are compared in column 806, and in step 540 Mayhew would be selected. In an embodiment of the invention, in the event that two or more experts are still tied, one more selection criterion could then be applied. By way of example, these other selection criteria could be expertise in a third expertise area; or a simple summation of the expertise indicators for the experts; or some other factor not tied to expertise per se, such as physical proximity; or a combination of one or more of the criterion listed above; or others.

In step 545 the designated expert is then identified to the user by a screen view in GUI 230. The presented screen includes the option to enable the user to allow the expert to assume remote control of the CAD program 200, and in particular the CAD program functions 210 and the resulting CAD model 220. If in step 550 the user grants the expert remote access capability, the process continues in step 555 to the flowchart of FIG. 9. If the user does not wish to grant such remote access, but wishes to obtain help from the expert, in step 560 the user contacts the expert (through email, phone, instant message, internet-based video conference, or some other similar communication method) and the expert provides the requested assistance, until in step 565 the user indicates that no further assistance is needed.

Figure 9:
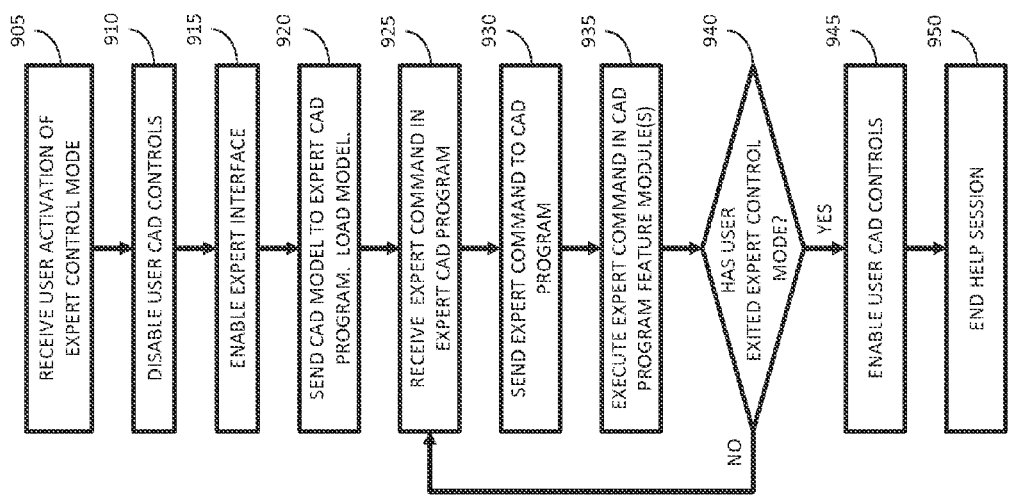
FIG. 9 is a flowchart of the interactions between the user and the expert once an expert has been selected, in accordance with an embodiment of the invention.

With reference to FIG. 9, when in step 550 of FIG. 8 the user indicates that she wants to grant the expert 280 remote access to the CAD system 200, in step 905 of FIG. 9 that indication is received by the expert remote control unit module 255. Optionally, in step 910 the expert remote control unit module 255 disables the user's control over the CAD system 200, such that the expert 280 can have unimpeded access; as a practical matter this step is not required. In step 915 the expert interface 257 in the expert remote control unit module 255 is activated, enabling the user and expert to exchange information (through email, phone, instant message, internet-based video conference, or some other similar communication method). In step 920 the CAD model 220 is sent, through the expert remote control unit module 255 of help center module 240 and the help center switchboard module 260, to the expert CAD program 285 where it is loaded so that the expert can have access to, and update, the CAD model at her location. Note that "sending" the CAD model to the expert 280 requires, amongst other things, that the expert CAD program be the same as, or otherwise compatible with, the CAD program 200 (at least in terms of the CAD program functions 210). As an alternative, in step 920 the help center module 240 initiates a handshaking protocol to confirm the programs are the same or compatible, in order to ensure that the expert CAD program 285 of the expert 280 can manipulate the CAD model 220. The expert 280 could then be presented with the option of downloading a compatible program to enable communications, or manipulating the CAD program functions 210 through an application program interface (API). In step 925 the expert submits a CAD model control command on her expert CAD program 285, which in step 930 is sent by the help center switchboard module 260 to the expert remote control unit module 255, which provides the command to both the expert interface module 257 (so that the user can observe, and learn from, the commands issued by the expert 280) and to the CAD program function 210 to correspondingly change the CAD model 220. In step 940, the help center module 240 queries the expert interface 257 to determine if the user has indicated that she wishes to terminate remote expert control. If so, the expert's remote access is terminated. If not, the process continues with the expert entering another command in step 925. If the user has terminated remote expert control, and if optional step 910 was applied to disable user control of the CAD system, in step 945 the user's control is re-established, and the user continues her use of CAD program 200, and the help session is terminated at step 950.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
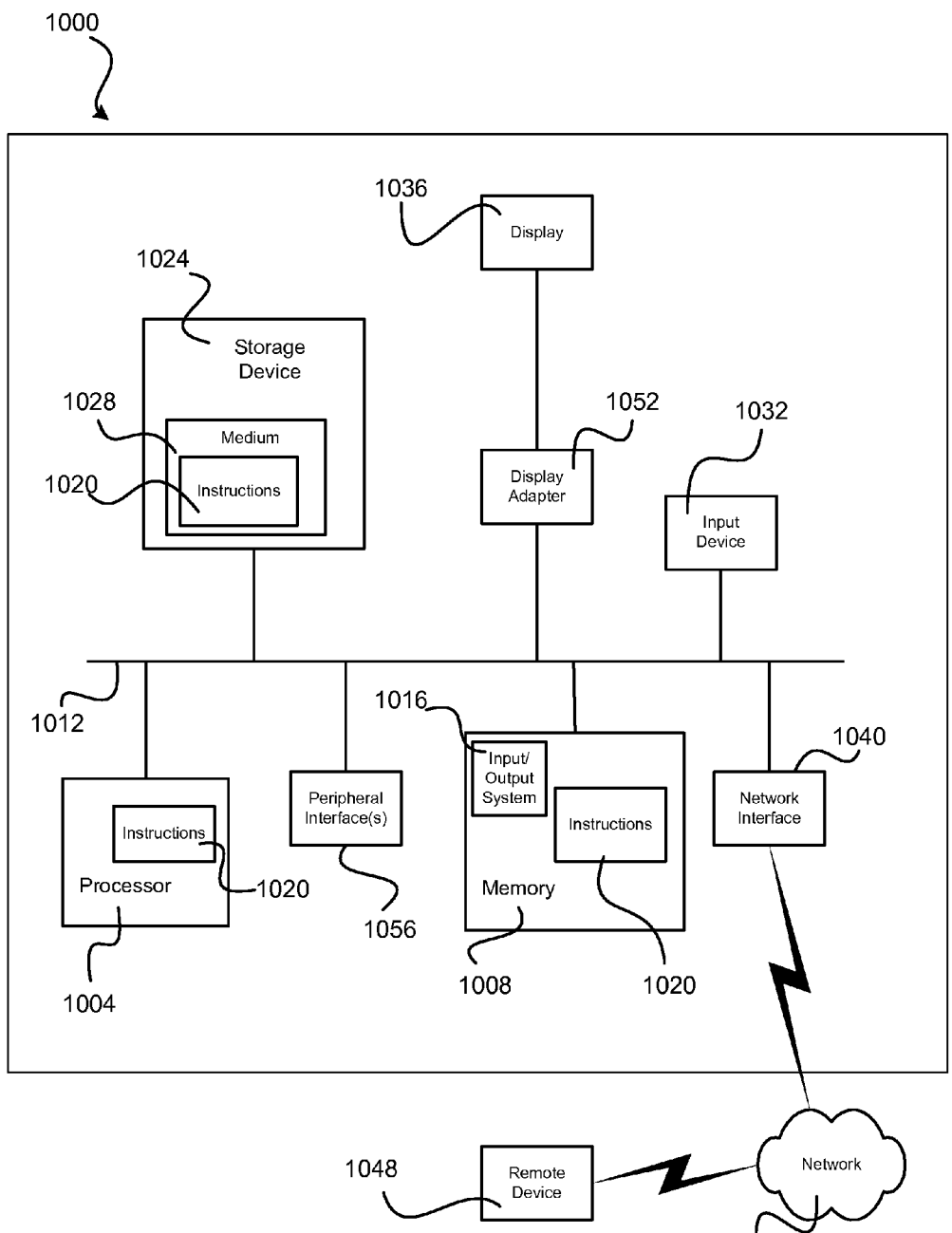
FIG. 10 is a block diagram view of a system that is controlled in accordance with an embodiment of the invention.

FIG. 10 shows a diagrammatic representation of one embodiment of a computing device in the exemplary form of a computer system 1000 within which a set of instructions for causing a control system, such as the system 200 of FIG. 2, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Memory 1008 may include various components (e.g., machine readable media) including, but not limited to, a random access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

In operation, the design state database 250 and the expert database 270 can be stored on a storage device associated with the computer of FIG. 10 (such as in storage device 1024) or on storage devices that are the same as those of storage device 1024, except on a remote device 1048 accessed through the network 1044 via the network interface 1040 (such as would be the case when using a cloud-based database solution as mentioned above with reference to FIG. 2). In an embodiment of the invention, the user would have local access to the CAD program 200, and remote access (as described below) to the help center switchboard module 260. Alternatively, the invention can be implemented in a software-as-a-service through a cloud connection, in which case the user would enter user input data via a GUI 230 that is provided on a remote device 1048, the experts 280 would have access through their own graphical user interface (not shown), and the remaining portions of the CAD program 200 and the help center switchboard module 260 would be resident on the storage device 1024 of a central (cloud) server 1000.

The foregoing has been a detailed description of illustrative embodiments of the invention. Various modifications and additions can be made without departing from the spirit and scope of this invention. For example, in addition to the supplier information database 205 as described herein, other supplier-related information that in turn originates from their suppliers (such as logistics/carriers) could be included. In addition, while the invention has been described with reference to a CAD system, the principles of the invention could be applied to other contexts in which help can be provided by subject matter experts. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

What is claimed is:

1. On a computer system including at least one processor and at least one computer readable medium storing machine-executable instructions including a plurality of modules that are executed by the processor, a method comprising:

causing the computer system including the at least one processor and the at least one computer readable medium storing machine-executable instructions to receive user inputs for utilizing a plurality of functions of a computer program;

causing the computer system to record an amount of time during which the user utilizes each of the plurality of functions, wherein recording the amount of time further comprises:

detecting a plurality of user actions;

identifying, for each action of the plurality of user actions an area of expertise associated with the action, a time of initiation of the action, and a time spent by the user on the action;

calculating a running total of time spent by the user on all actions over a continuous period using the time spent on by the user on each action of the plurality of user actions; and writing the time spent on each action and the running total to a design state database;

causing the computer system to receive an indication from a user that assistance is requested;

causing the computer system to identify an area of expertise associated with a greatest usage of functions of the plurality of functions during the period, wherein identifying further comprises:

listing a plurality of areas of expertise, the plurality of areas of expertise including each area of expertise associated with user actions of the plurality of user actions;

summing a total running time per area of expertise by aggregating the time spent by the user on each action of each area of expertise;

determining a proportion of the running total representing the total running time of each area of expertise; and identifying the area of expertise associated with the largest proportion of the running total; and based on the identified area of expertise associated with the greatest use of the plurality of functions, causing the computer system to identify expertise to provide assistance to the user.

2. A method according to claim 1, wherein the step of causing the computer system to record an amount of time during which the user utilizes each of the plurality of functions comprises grouping the functions into a plurality of functional groups, and recording an amount of time during which the user utilizes at least some of the plurality of functional groups.

3. A method according to claim 1 wherein the step of causing the computer system to identify expertise to provide assistance to the user comprises designating one of a plurality of experts.

4. A method according to claim 3, wherein designating one of the plurality of experts comprises comparing a representation of expertise of each of the plurality of experts for each of the plurality of areas of expertise to the identified area of expertise associated with the greatest usage of functions of the plurality of functions.

5. A non-transitory computer readable medium storing machine-executable instructions including a plurality of modules that are executed by a processor of a computer system, the instructions when executed by the processor causing the computer system to execute a method comprising:
  receiving user inputs for utilizing a plurality of functions of a computer program;
  recording an amount of time during which the user utilizes each of the plurality of functions, wherein recording the amount of time further comprises:
  detecting a plurality of user actions;
  identifying, for each action of the plurality of user actions an area of expertise associated with the action, a time of initiation of the action, and a time spent by the user on the action;
  calculating a running total of time spent by the user on all actions over a continuous period; and
  writing the time spent on each action and the running total to a design state database;
  receiving an indication from a user that assistance is requested; identifying an area of expertise associated with a greatest usage of functions of the plurality of functions, wherein identifying further comprises:
  listing a plurality of areas of expertise, the plurality of areas of expertise including each area of expertise associated with user actions of the plurality of user actions;
  summing a total running time per area of expertise by aggregating the time spent by the user on each action of each area of expertise;
  determining a proportion of the running total representing the total running time of each area of expertise;
  comparing the identified area of expertise associated with the greatest usage of functions of the plurality of functions to an indication of expertise of a plurality of experts in the area of expertise associated with the greatest usage of functions of the plurality of functions; and
  identifying a selected one of the plurality of experts having a relatively high indication of expertise in the area of expertise associated with the greatest usage of functions of the plurality of functions.

6. A method according to claim 5, wherein the step of recording an amount of time during which the user utilizes each of the plurality of functions comprises grouping the functions into a plurality of functional groups, and recording an amount of time during which the user utilizes each of the plurality of functional groups.

7. A method according to claim 1, wherein the step identifying a selected one of the plurality of experts further comprises:
  assigning an expertise score to at least some of the plurality of experts for at least some of the plurality of areas of expertise;
  indicating expert availability; and
  selecting experts based on a sort of the plurality of areas of expertise in order of most frequently used, the indication of expert availability, and the expertise score.

8. A method according to claim 7, further comprising:
  indicating activities that a given expert should not be selected to perform, wherein the step of selecting experts is further based on the indication of activities that a given expert should not be selected to perform.

9. A method according to claim 7, wherein if multiple experts are initially selected based on which of the plurality of areas of expertise is most frequently used, a single expert is selected based on expertise scores of the multiple experts for a next most frequently used of the plurality of areas of expertise.

10. A method according to claim 5, further comprising:
  enabling the selected one of the plurality of experts to control the computer program for which the user requests assistance.

11. A method according to claim 5, wherein the step of comparing the respective amounts of time the user utilizes each of the plurality of functions to one another further comprises:
  assigning a weighing factor to at least some of the plurality of functions; and
  adjusting the amount of time the user utilizes a given one of the plurality of functions for which a weighing factor has been assigned, as a function of the weighing factor.

12. A method according to claim 5, wherein the step of comparing the respective amounts of time the user utilizes each of the plurality of functions to one another further comprises the steps of:
  providing an indication to the user of potential help topics, each of the potential help topics being related to a respective one of the plurality of areas of expertise, the indication being based on the respective amounts of time; and
  receiving a selection from the user of at least one desired help topic.

13. A method according to claim 12, wherein
  the step of comparing identified most frequently used ones of the plurality of functions to an indication of expertise of a plurality of experts comprises comparing the desired help topic to the indications of expertise; and wherein
  the step of identifying a selected one of the plurality of experts having a relatively high indication of expertise comprises selecting an expert having a relatively high indication of expertise in the desired help topic.

14. A method according to claim 10, wherein the computer program is a computer-assisted design program.

15. A non-transitory computer readable medium storing machine-executable instructions including a plurality of modules that are executed by a processor, the instructions causing the processor to execute a method comprising:
  receiving user inputs for utilizing a plurality of functions of a computer program;

recording an amount of time during which the user utilizes each of the plurality of functions, wherein recording the amount of time further comprises:
  detecting a plurality of user actions;
  identifying, for each action of the plurality of user actions an area of expertise associated with the action, a time of initiation of the action, and a time spent by the user on the action;
  calculating a running total of time spent by the user on all actions over a continuous period; and
  writing the time spent on each action and the running total to a design state database;
receiving an indication from a user that assistance is requested;
identifying an area of expertise associated with a greatest usage of functions of the plurality of functions, wherein identifying further comprises:
  listing a plurality of areas of expertise, the plurality of areas of expertise including each area of expertise associated with user actions of the plurality of user actions;
  summing a total running time per area of expertise by aggregating the time spent by the user on each action of each area of expertise;
  determining a proportion of the running total representing the total running time of each area of expertise; and
based on the identified area of expertise associated with greatest usage of functions of the plurality of functions, identifying expertise to provide assistance to the user.

* * * * *